(12) United States Patent
Kaneko et al.

(10) Patent No.: US 6,744,506 B2
(45) Date of Patent: Jun. 1, 2004

(54) DEPOLARIZING PLATE AND AN OPTICAL APPARATUS USING THE SAME

(75) Inventors: Tsutomu Kaneko, Tokyo (JP); Toshikazu Yamamoto, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/163,915

(22) Filed: Jun. 6, 2002

(65) Prior Publication Data

US 2002/0186371 A1 Dec. 12, 2002

(30) Foreign Application Priority Data

Jun. 8, 2001 (JP) .................................... P. 2001-173722

(51) Int. Cl.$^7$ ................................................. G01J 3/18
(52) U.S. Cl. ........................ 356/328; 356/333; 356/334
(58) Field of Search ................................. 356/326, 327, 356/328, 331, 332, 333, 334

(56) References Cited

U.S. PATENT DOCUMENTS

| | | | | |
|---|---|---|---|---|
| 4,198,123 A | * | 4/1980 | Kremen | 359/496 |
| 5,532,818 A | | 7/1996 | Tokumoto | 356/333 |
| 6,166,805 A | | 12/2000 | Mori et al. | 356/331 |

FOREIGN PATENT DOCUMENTS

| | | |
|---|---|---|
| DE | 195 39 004 A1 | 4/1996 |
| EP | 0 417 709 A2 | 3/1991 |
| JP | 05215918 | 8/1993 |

OTHER PUBLICATIONS

Patent Abstracts of Japan, vol. 013, No. 104 (P–842), Mar. 13, 1989 & JP 63 284432 A, Nov. 21, 1988.

* cited by examiner

*Primary Examiner*—F. L. Evans
(74) *Attorney, Agent, or Firm*—Fish & Richardson P.C.

(57) ABSTRACT

A depolarizing plate comprising a first rectangular wedge plate that has a first crystallographic optical axis in a diagonal direction of the rectangle and which has a thickness thereof in a vertical direction vary continuously in a direction 45 degrees from said first crystallographic optical axis and a second rectangular wedge plate that has a second crystallographic optical axis in a diagonal direction of the rectangle crossing said first crystallographic optical axis at right angles and which has a thickness thereof in a vertical direction vary continuously in a direction 45 degrees from said second crystallographic optical axis, the two wedge plates being joined in such a position that said first crystallographic optical axis crosses said second crystallographic optical axis at right angles, wherein the slope formed by the joint of said wedge plates is rotated about the optical axis of an incident ray of light.

6 Claims, 7 Drawing Sheets

EXEMPLARY LAYOUT OF THE OPTICAL SPECTRUM ANALYZER OF THE INVENTION

FIG. 1 DEPOLARIZING PLATE OF THE INVENTION

FIG. 2 CONVENTIONAL DEPOLARIZING PLATE

FIG. 3

EXEMPLARY LAYOUT OF CONVENTIONAL
MONOCHROMATOR

FIG. 4A

CONDENSATION OF LIGHT ON THE EXIT SLIT IN CONVENTIONAL DEPOLARIZING PLATE

FIG. 4B

CONDENSATION OF LIGHT ON THE EXIT SLIT IN THE DEPOLARIZING PLATE OF THE INVENTION

FIG. 5

SPLITTING INTO TWO RAYS BY DEPOLARIZING PLATE

FIG. 6

EXEMPLARY SELECTION OF NARROW WAVELENGTH
COMPONENT BY PLANE DIFFRACTION GRATING

FIG. 7

EXEMPLARY LAYOUT OF THE MONOCHROMATOR
OF THE INVENTION

FIG. 8

EXEMPLARY LAYOUT OF THE OPTICAL SPECTRUM
ANALYZER OF THE INVENTION

FIG. 9

EXEMPLARY LAYOUT OF THE DOUBLE-PASS
MONOCHROMATOR OF THE INVENTION

DEPOLARIZING PLATE AND AN OPTICAL APPARATUS USING THE SAME

BACKGROUND OF THE INVENTION

The present invention relates to a depolarizing plate for use in eliminating polarization dependency, as well as a monochromator, an optical spectrum analyzer and other optical apparatus that use the depolarizing plate.

Figure 2:
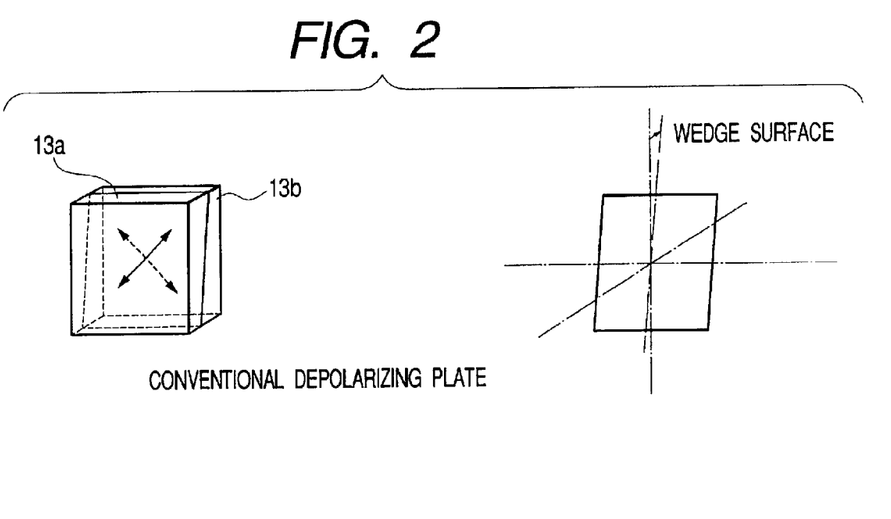
FIG. 2 shows the structure of a conventional depolarizing plate.

A conventional depolarizing plate is shown in FIG. 2. In FIG. 2, numerals 13a and 13b refer to wedge plates each made of a birefringent material such as quartz.

As shown in FIG. 2, each wedge plate has a crystallographic optical axis 45 degrees from the vertical direction (as indicated by the solid arrow for wedge plate 13a and by the dashed arrow for wedged plate 13b).

The wedge plates 13a and 13b are so cut that their thickness varies in a vertical direction and they are joined together such that their crystallographic optical axes cross each other at right angles.

Therefore, the thickness of each wedge plate varies continuously in a direction 45 degrees from a crystallographic optical axis thereof.

A birefringent material has the ability to confer a phase difference between two components of light that passes through it, one vibrating in a direction parallel to a crystallographic optical axis thereof and the other vibrating in a direction normal to the crystallographic optical axis. The conferred phase difference is proportional to the thickness of the birefringent material.

In the depolarizing plate shown in FIG. 2, the thickness of each wedge plate varies in the vertical direction which is 45 degrees from a crystallographic optical axis thereof; hence, the phase difference conferred differs with the position where light passes and the transmitted light is spatially a mixture of many states of polarization.

The incident light passing through the conventional depolarizing plate shown in FIG. 2 is split into two rays at the wedge portion.

Figure 5:
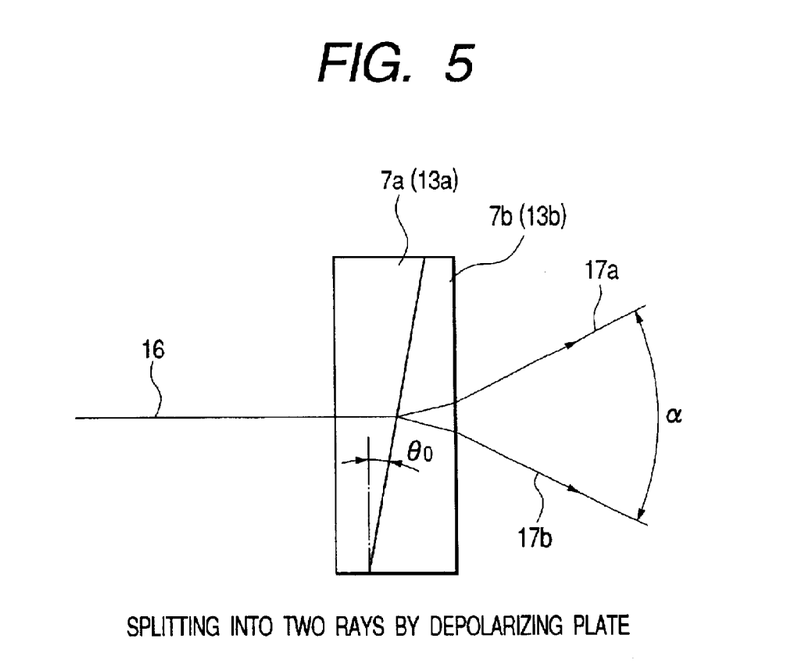
FIG. 5 is a diagram illustrating how light is split into two rays by a depolarizing plate.

This splitting of light is shown below with reference to FIG. 5.

A ray of light which is ordinary for the wedge plate 13a is extraordinary for the wedge plate 13b whereas an extraordinary ray for the wedge plate 13a is ordinary for the wedge plate 13b. Therefore, the materials difference in refractive index causes refraction at the wedge portion but in different directions, splitting the incident light into two rays.

The split rays satisfy the following relation:

$$\alpha = 2(n_e - n_o)\tan\theta_0$$

where $\alpha$: the angle between the two split rays;
$\theta_0$: the angle of the wedge
$n_e$: the refractive index for the ordinary light
$n_o$: the refractive index for the extraordinary light.

Figure 3:
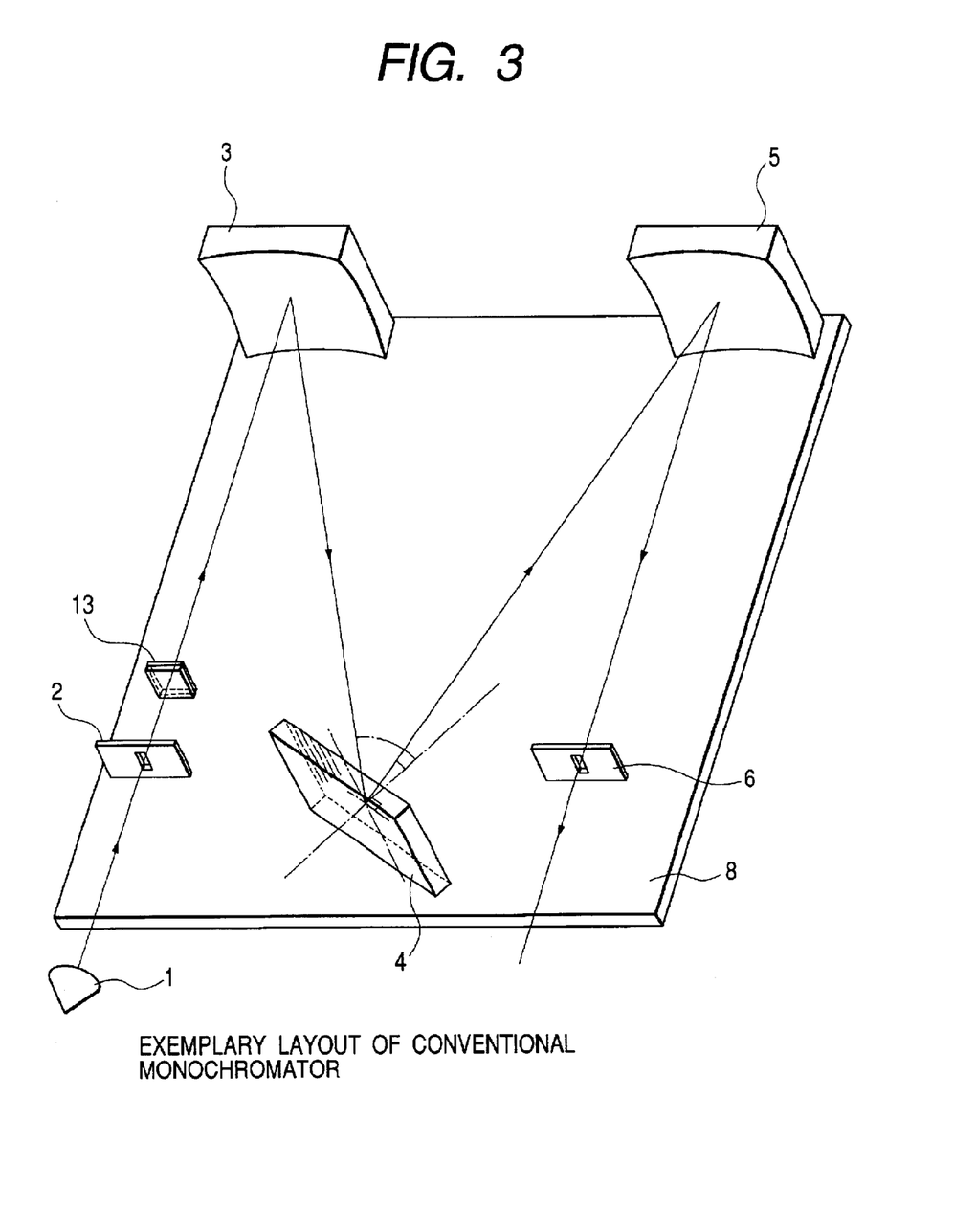
FIG. 3 is a diagram showing the structure of a conventional monochromator.

The conventional depolarizing plate 13 shown in FIG. 2 may be applied to a conventional monochromator of the type shown in FIG. 3 which has a concave mirror 3 which causes incident light 1 to emerge after it is converted to parallel light through an entrance slit 2, a plane diffraction grating 4 which diffracts the parallel light emerging from the concave mirror, a concave mirror 5 which condenses the diffracted light from the plane diffraction grating, and an exit slit 6 for selecting only a specified wavelength component of light.

Figure 6:
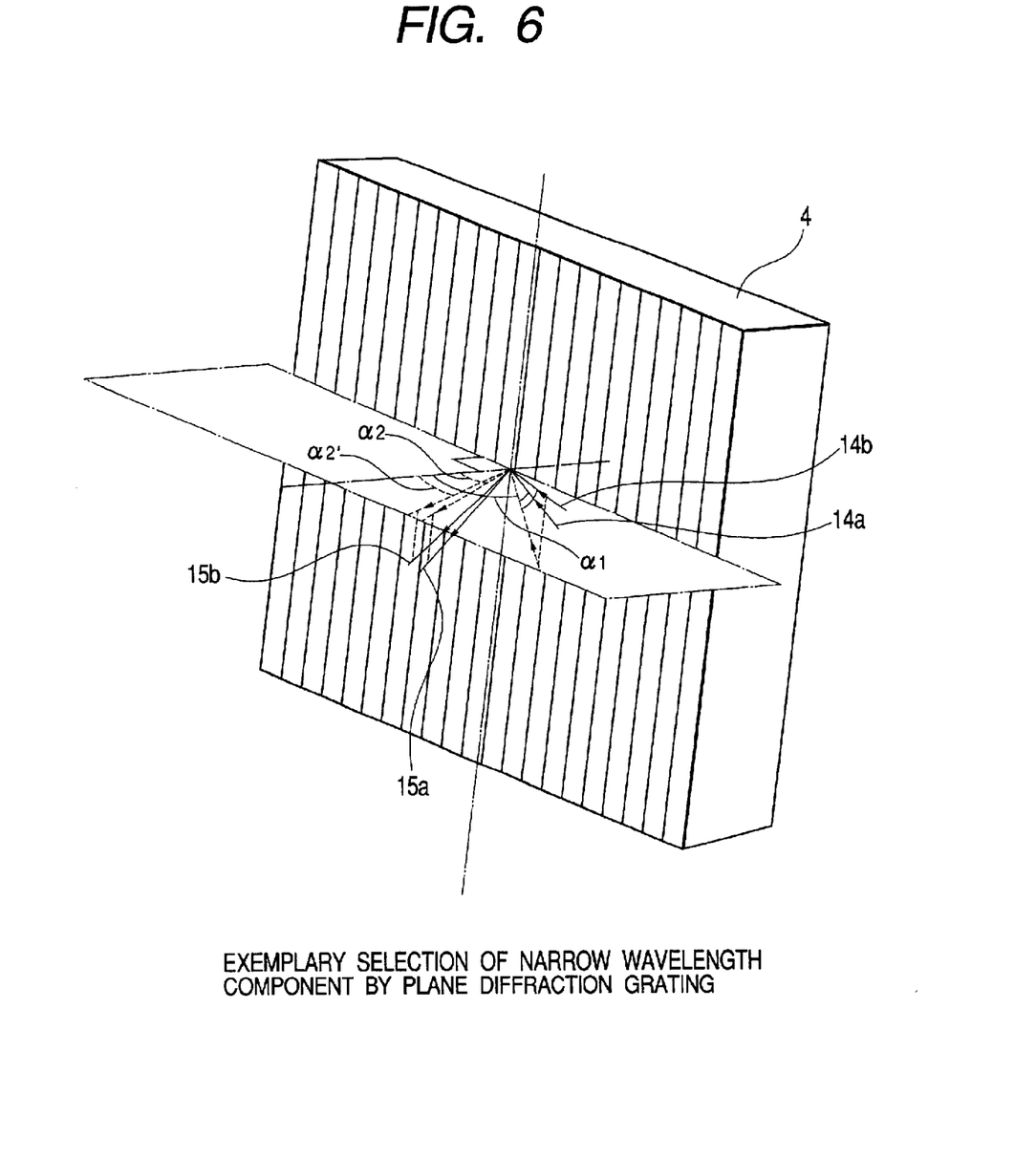
FIG. 6 is a diagram showing how a particular narrow wavelength component is selected from a continuous spectrum of incident light by means of a plane diffraction grating.

Further referring to FIG. 3, the incident light 1 is launched onto the depolarizing plate via the entrance slit 2, where it is split into two rays; the split rays are incident on the plane diffraction grating in the manner described below with reference to FIG. 6.

The two split rays of light (14a, 14b) emerging from the depolarizing plate 13 are collimated by the first concave mirror 3 and incident on the plane diffraction grating 4 to be diffracted respectively.

Details of diffraction by the grating 4 are given below with reference to FIG. 6.

The relationship between the angle of incidence on the plane diffraction grating 4 and the angle of diffraction is described by the following equation:

$$m\lambda = d \cdot \cos\theta(\sin\alpha_1 + \sin\alpha_2)$$

where m: the order of diffraction
d: grating constant
$\lambda$: wavelength
$\theta$: the angle formed between incident light and the direction of groove depth
$\alpha_1$: the angle of incidence of light on the diffraction grating
$\alpha_2$: the angle of emergence of light from the diffraction grating.

In the equation given above, the two split rays 14a and 14b have the same incident angle $\alpha_1$.

However, due to the angle $\alpha$ between the two split rays from the depolarizing plate 13, the angle $\theta$ formed between the angle of incidence on the plane diffraction grating 4 and the direction of the depth of grooves in the plane diffraction grating will take different values except in the case where the height of intercept of the concave mirror 3 by the incident light coincides with the central axis of the concave mirror.

Thus, the two split rays have different values for the angle of emergence $\alpha_2$.

Figure 4A:
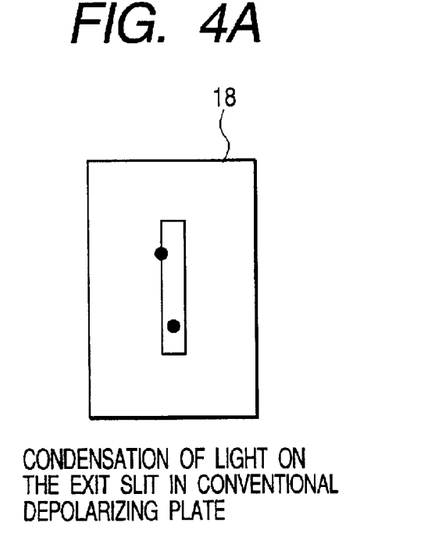
FIG. 4A is a diagram showing how light is condensed on an exit slit in the conventional depolarizing plate.

Hence, as shown by dots in FIG. 4A, the two split rays are skewed with respect to the longitudinal direction of the rectangular opening in the exit slit 6.

As a result, one of the two split rays will not be able to pass through the exit slit.

However, the exit slit has to choose a specified wavelength component from the condensed light.

Since the components of light condensed at the two points have the same wavelength, all of the light at those points need emerge from the exit slit 6 and to this end, the following adjustment is required.

In order to ensure that the two split rays are both transmitted through the narrow exit slit 6, the parallel light obtained by collimating the split incident light with the concave mirror 3 need be launched onto the plane diffraction grating 4 with the angle $\theta$ between the incident light and the depth of grooves in the plane diffraction grating being adjusted to be the same in all situations.

In other words, the height of intercept by the incident light is brought into registry with the central axis of the concave mirror.

This puts a constraint on the parts layout of the monochromator, introducing greater difficulty into apparatus designing.

With a view to increasing the resolving power of the monochromator or expanding a dynamic range thereof toward the near end, the incident light may be diffracted by the plane diffraction grating two or more times but it is all the more difficult to design a capability for ensuring that only the light that has been diffracted a plurality of times will pass through the exit slit.

As an alternative, the offset between two condensed spots of light may be eliminated by adjusting the tilting of the exit slit. However, if the height of light intercept varies due to disturbances such as temperature changes, the angle setting for the plane diffraction grating may be offset from the wavelength of the emerging light to deteriorate a spectral characteristics thereof.

As described above, the use of the conventional depolarizing plate of FIG. 2 in a monochromator has involved the problem that two rays of light emerging from the depolarizing plate are split obliquely to the longitudinal direction of the rectangular opening in the exit slit on account of the diffraction by the plane diffraction grating and cannot pass through the exit slit simultaneously.

SUMMARY OF THE INVENTION

An object of the invention is to provide a novel depolarizing plate which splits incident light into two rays along the length of a rectangular opening in an exit slit in such a way that both rays can pass through the exit slit.

Another object of the invention is to provide a monochromator and an optical spectrum analyzer that assure high precision using the depolarizing plate.

Figure 1:
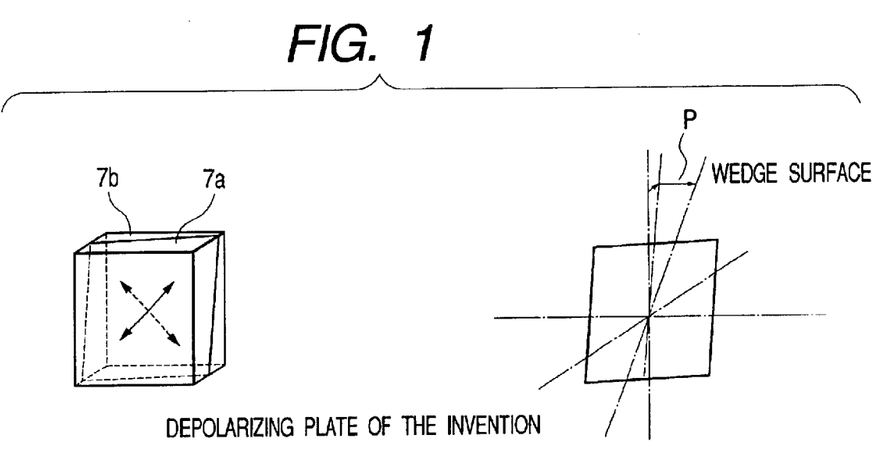
FIG. 1 shows the structure of the depolarizing plate of the invention.

In order to attain these objects, the invention first provides a depolarizing plate 7 comprising a first rectangular wedge plate 7a that has a first crystallographic optical axis in a diagonal direction of the rectangle and which has a thickness thereof in a vertical direction vary continuously in a direction 45 degrees from the first crystallographic optical axis and a second rectangular wedge plate 7b that has a second crystallographic optical axis in a diagonal direction of the rectangle crossing the first crystallographic optical axis at right angles and which has a thickness thereof in a vertical direction vary continuously in a direction 45 degrees from the second crystallographic optical axis, the two wedge plates being joined in such a position that the first crystallographic optical axis crosses the second crystallographic optical axis at right angles, wherein the slope formed by the joint of the wedge plates is rotated about the optical axis of an incident ray of light (aspect 1).

The invention also provides a monochromator comprising a first concave mirror which causes incident light to emerge after it is converted to parallel light through an entrance slit, a plane diffraction grating which diffracts the parallel light emerging from the concave mirror, a second concave mirror which condenses the diffracted light from the plane diffraction grating, and an exit slit for selecting only a specified wavelength component of light, wherein the depolarizing plate according to aspect 1 is provided between the entrance slit and the first concave mirror (aspect 2).

In an embodiment, the slope formed by the joint of the wedge plates is rotated about the optical axis of an incident ray of light such that the rays of light split by the depolarizing plate can pass through a rectangular opening in the exit slit simultaneously (aspect 3).

In another embodiment, the monochromator according to aspect 3 is furnished with a reflecting unit for reflecting the reflected light from the second concave mirror such that light is incident on the plane diffraction grating a plurality of times (aspect 4).

The invention also provides an optical spectrum analyzer comprising the monochromator according to aspect 3, as well as a plane diffraction grating rotating mechanism which causes the plane diffraction grating 4 to rotate about an axis parallel to the grating, a light receiver 10, a control section 11 and a display 12 (aspect 5).

In an embodiment, the optical spectrum analyzer according to aspect 5 is designed as a multi-pass optical spectrum analyzer which has a reflecting unit for reflecting the reflected light from the second concave mirror such that light is incident on the plane diffraction grating a plurality of times (aspect 6).

A monochromator of higher precision can be designed by using a depolarizing plate comprising a first rectangular wedge plate that has a first crystallographic optical axis in a diagonal direction of the rectangle and which has a thickness thereof in a horizontal and a vertical direction vary continuously in a direction 45 degrees from the first crystallographic optical axis and a second rectangular wedge plate that has a second crystallographic optical axis in a diagonal direction of the rectangle crossing the first crystallographic optical axis at right angles and which has a thickness thereof in a horizontal and a vertical direction vary continuously in a direction 45 degrees from the second crystallographic optical axis, the two wedge plates being joined in such a position that the first crystallographic optical axis crosses the second crystallographic optical axis at right angles, wherein the slope formed by the joint of the wedge plates is rotated about the optical axis of an incident ray of light (aspect 3).

If the monochromator according to aspect 3 is furnished with a reflecting unit for reflecting the reflected light from the second concave mirror such that light is incident on the plane diffraction grating a plurality of times, a multi-pass monochromator is realized that enables more precise spectral resolution by more effective utilization of the depolarizing plate of the invention (aspect 4).

If desired, a plane diffraction grating rotating mechanism which causes the plane diffraction grating 4 to rotate about an axis parallel to the grating, a light receiver 10, a control section 11 and a display 12 may be added to the monochromator according to aspect 3, thereby designing an optical spectrum analyzer (aspect 5).

A multi-pass optical spectrum analyzer can also be designed by furnishing the optical spectrum analyzer according to aspect 5 with a reflecting unit for reflecting the reflected light from the second concave mirror such that light is incident on the plane diffraction grating a plurality of times (aspect 6).

DETAILED DESCRIPTION OF THE PREFERRED EMBODIMENTS

The depolarizing plate of the invention is described below with reference to FIG. 1. In FIG. 1, numerals 7a and 7b refer to wedge plates each made of a birefringement material such as quartz.

As in the wedge plates 13a and 13b in the conventional depolarizing plate, the wedge plates 7a and 7b in the depolarizing plate of the invention have their optical axes oriented at respective angles of +45° and −45°. However, the slope of the joint between the first wedge plate 7a and the second wedge late 7b along which plate thickness varies in the vertical direction in the prior art is rotated about the optical axis of incident light as indicated by p in FIG. 1.

As in the case shown in FIG. 1, the incident light passing through the depolarizing plate of the invention is split into two rays at the wedge portion.

This splitting of light is shown below with reference to FIG. 5.

A ray of light which is ordinary for the wedge plate 7a is extraordinary for the wedge plate 7b whereas an extraordinary ray for the wedge plate 7a is ordinary for the wedge plate 7b. Therefore, the materials difference in refractive index causes refraction at the wedge portion but in different directions, splitting the incident light into two rays.

The split rays satisfy the following relation:

$$\alpha = 2(n_e - n_o)\tan\theta_0$$

where $\alpha$: the angle between the two split rays;

$\theta_0$: the angle of the wedge $n_e$: the refractive index for the ordinary light $n_o$: the refractive index for the extraordinary light.

Figure 7:
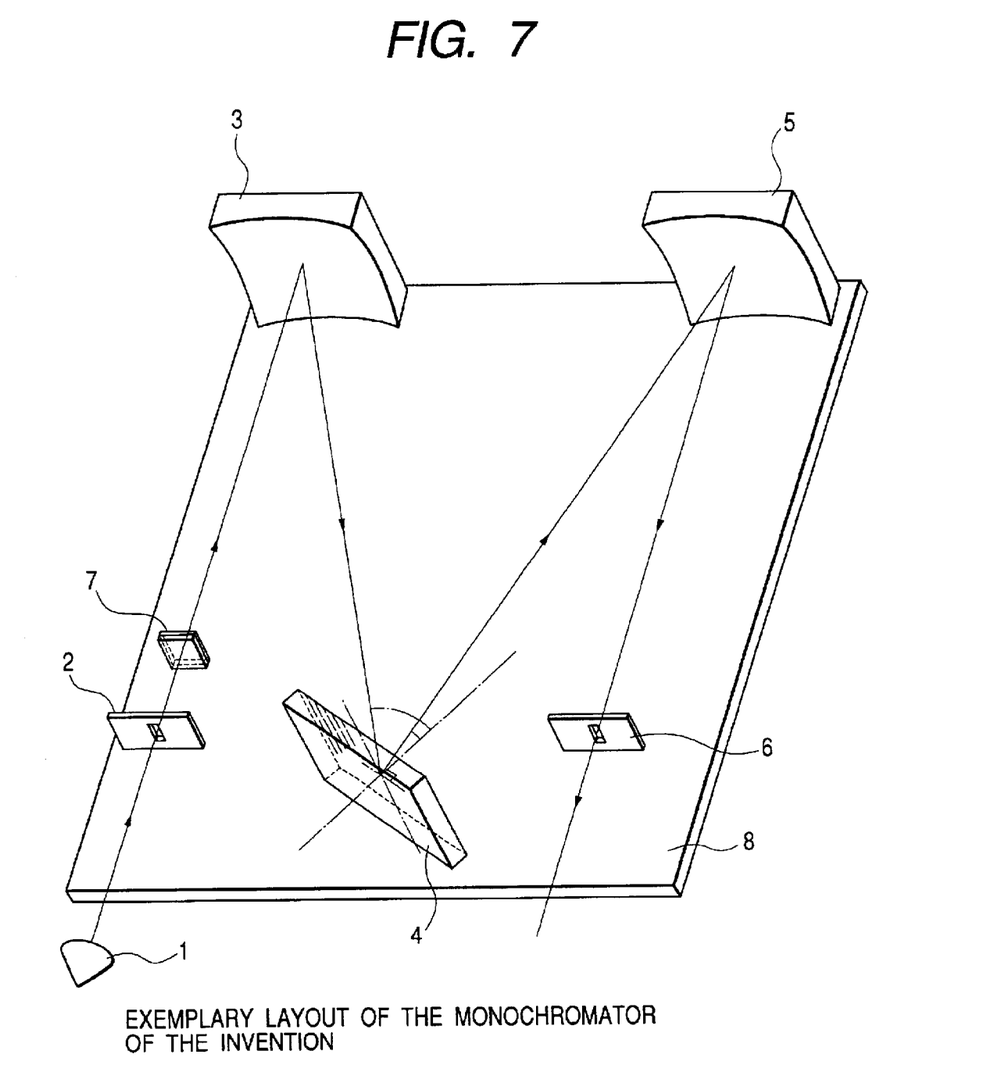
FIG. 7 is a diagram showing the structure of the monochromator of the invention.

The depolarizing plate of the invention which is indicated by 7 in FIG. 1 may be applied to the invention monochromator of the type shown in FIG. 7 which has a concave mirror 3 which causes incident light 1 to emerge after it is converted to parallel light through an entrance slit 2, a plane diffraction grating 4 which diffracts the parallel light emerging from the concave mirror, a concave mirror 5 which condenses the diffracted light from the plane diffraction grating, and an exit slit 6 for selecting only a specified wavelength component of light.

Further referring to FIG. 7, the incident light 1 is launched onto the depolarizing plate via the entrance slit 2, where it is split into two rays; the split rays are incident on the plane diffraction grating in the manner described below with reference to FIG. 6.

The two split rays of light (14a, 14b) emerging from the depolarizing plate 7 are collimated by the first concave mirror 3 and incident on the plane diffraction grating 4 to be diffracted respectively.

Details of diffraction by the grating 4 are given below with reference to FIG. 6.

The relationship between the angle of incidence on the plane diffraction grating 4 and the angle of diffraction is described by the following equation:

$$m\lambda = d\cdot\cos\theta(\sin\alpha_1 + \sin\alpha_2)$$

where m: the order of diffraction d: grating constant $\lambda$: wavelength $\theta$: the angle formed between incident light and the direction of groove depth $\alpha_1$: the angle of incidence of light on the diffraction grating $\alpha_2Z$: the angle of emergence of light from the diffraction grating.

Due to the angle $\alpha$ between two split rays, the angle $\theta$ formed between the angle of incidence on the plane diffraction grating 4 and the direction of the depth of grooves in the plane diffraction grating takes different values. In the depolarizing plate of the invention, the slope of the joint between the first wedge plate 7a and the second wedge plate 7b is rotated about the optical axis of the incident ray of light and, hence, the two split rays will be incident on the plane diffraction grating 4 at different values of incident angle $\alpha_1$.

This makes it possible to ensure that the two rays will emerge from the plane diffraction grating 4 at the same angle of emergence $\alpha_2$.

Figure 4B:
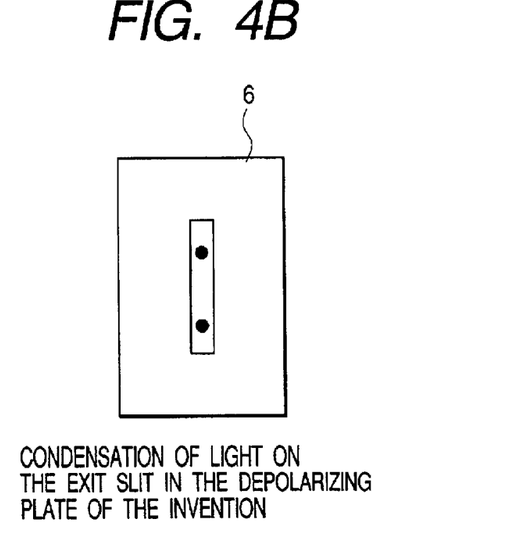
FIG. 4B is a diagram showing how light is condensed on an exit slit in the depolarizing plate of the invention.

Since the two rays emerge from the plane diffraction grating 4 at the same angle, they are eventually condensed by exit slit 6 and focused at two points that are spaced apart in the longitudinal direction of the rectangular opening as shown in FIG. 4B.

This provides a solution to the problem of the conventional depolarizing plate which has not been capable of allowing two split rays to pass through the exit slit simultaneously.

The depolarizing plate 7 of the invention which is shown in FIG. 1 may be applied to an optical spectrum analyzer comprising a monochromator comprising a concave mirror 3 which causes incident light 1 to emerge after it is converted to parallel light through an entrance slit 2, a plane diffraction grating 4 which diffracts the parallel light emerging from the concave mirror, a concave mirror 5 which condenses the diffracted light from the plane diffraction grating, and an exit slit 6 for selecting only a specified wavelength component of light, as well as a plane diffraction grating rotating mechanism 9 which causes the plane diffraction grating 4 to rotate about an axis parallel to the grating, a light receiver 10, a control section 11 and a display 12. The optical spectrum analyzer is now described with reference to FIG. 8.

Figure 8:
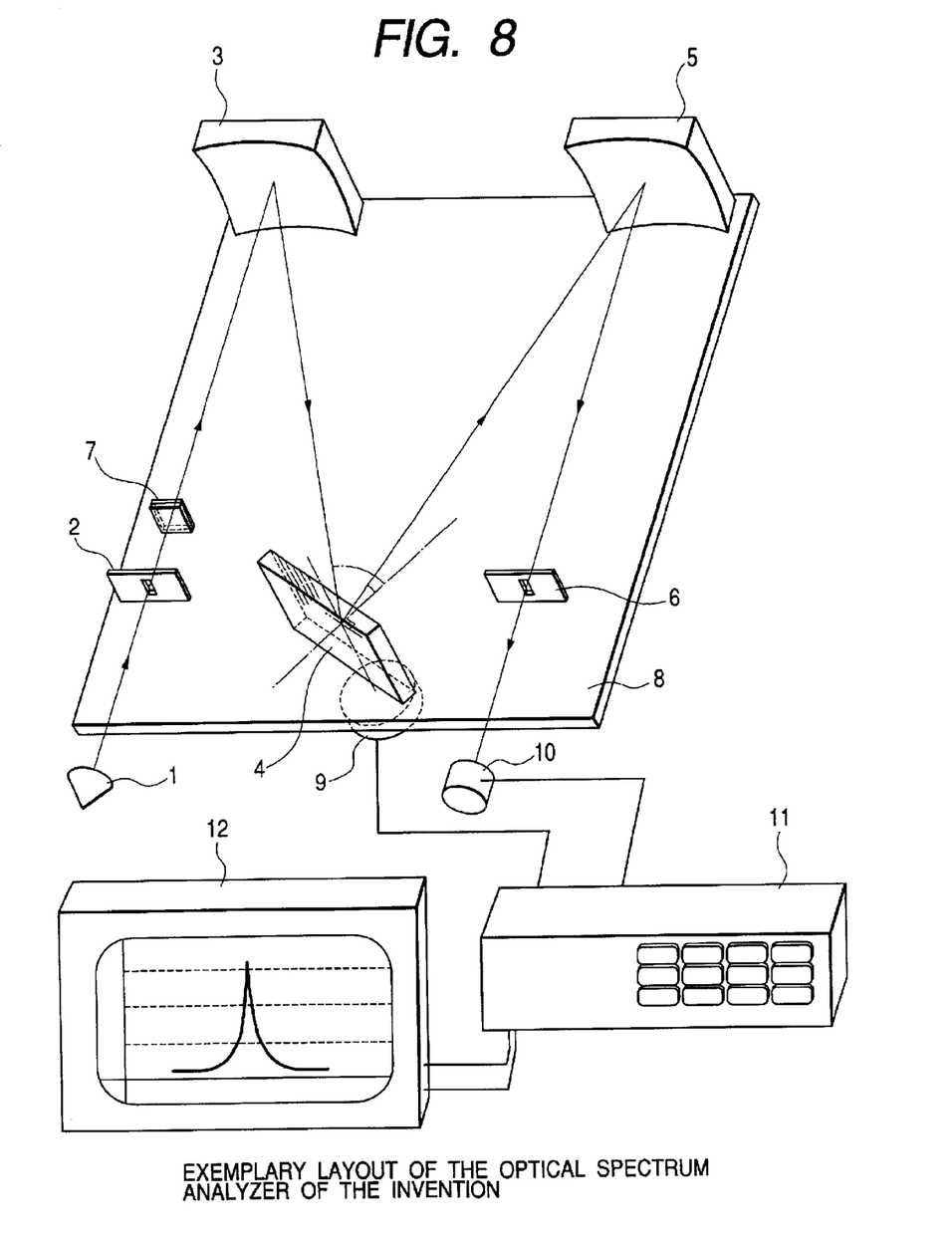
FIG. 8 is a diagram showing the structure of the optical spectrum analyzer of the invention.

By adjusting the plane diffraction grating rotating mechanism 9 in accordance with the output of the control section 11, the optical spectrum analyzer can achieve higher precision in measuring the intensity of a particular wavelength component of the incident light and presenting a spectrum thereof on the screen of the display 12.

Figure 9:
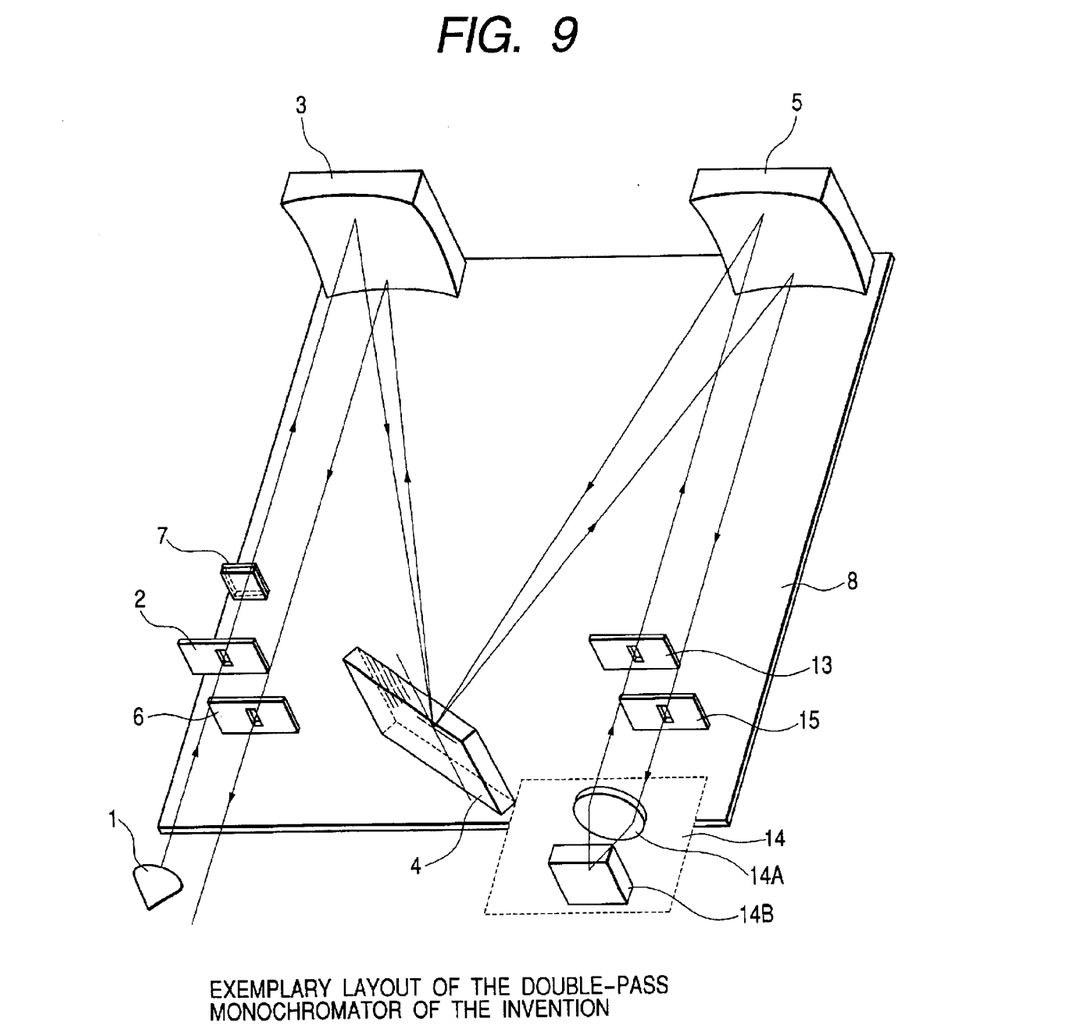
FIG. 9 is a diagram showing the structure of the multi-pass monochromator of the invention.

FIG. 9 shows another example in which the depolarizing plate of the invention is applied to a multi-pass monochromator.

In FIG. 9, the numeral reference 1 designates incident light, 2, 6, 13 and 15 refer to slits, 3 and 5 are concave mirrors, 4 is a plane diffraction grating, 14A is a lens, and 14B is a plane mirror.

Indicated by 7 is the depolarizing plate of the invention used to eliminate the polarization dependency of the plane diffraction grating 4; the incident light is reflected by the plane mirror 14B to make the second incidence on the plane diffraction grating 4, enabling the separation of a more precise wavelength component.

In the example under consideration, a means for offsetting the position of incidence from the height of emergence of the diffracted light is employed in order to pick up the second diffracted ray without blocking the incident light.

In the multi-pass monochromator of the type described above, split rays of light coming from the depolarizing plate are incident on the plane diffraction grating at different values of angle $\theta$, causing the light to focus on the exit slit at two offset positions. The depolarizing plate of the invention is particularly effective to deal with this problem.

The multi-pass monochromator of the example just described above is a double-pass monochromator that permits light to be diffracted twice by the plane diffraction grating. Needless to say, the monochromator may be of such a type that light may be diffracted by the plane diffraction grating three or more times.

The utility of the invention is by no means limited to the Czerny-Turner monochromator used in the description of the invention and it may be applied to, various other modifications including the Littrow monochromator.

According to the invention recited in aspect 1, there is provided a novel a depolarizing plate 7 comprising a first rectangular wedge plate 7a that has a first crystallographic optical axis in a diagonal direction of the rectangle and which has a thickness thereof in a vertical direction vary continuously in a direction 45 degrees from the first crystallographic optical axis and a second rectangular wedge plate 7b that has a second crystallographic optical axis in a diagonal direction of the rectangle crossing the first crystallographic optical axis at right angles and which has a thickness thereof in a vertical direction vary continuously in a direction 45 degrees from the second crystallographic optical axis, the two wedge plates being joined in such a position that the first crystallographic optical axis crosses the second crystallographic optical axis at right angles, wherein the slope formed by the joint of the wedge plates is rotated about the optical axis of an incident ray of light.

According to the invention recited in aspect 2, there is provided a monochromator that does not depend on the state of polarization of incident light and which comprises a first concave mirror which causes incident light to emerge after it is converted to parallel light through an entrance slit, a plane diffraction grating which diffracts the parallel light emerging from the concave mirror, a second concave mirror which condenses the diffracted light from the plane diffraction grating, and an exit slit for selecting only a specified wavelength component of light, wherein the depolarizing plate according to aspect 1 is provided between the entrance slit and the first concave mirror.

According to the invention recited in aspect 3, the slope formed by the joint of the wedge plates is rotated about the optical axis of an incident ray of light such that the rays of light split by the depolarizing plate can pass through a rectangular opening in the exit slit simultaneously.

In the invention recited in aspect 4, the monochromator according to aspect 3 can be designed to have higher precision by furnishing it with a reflecting unit for reflecting the reflected light from the second concave mirror such that light is incident on the plane diffraction grating a plurality of times.

In the invention recited in aspect 5, an optical spectrum analyzer capable of more precise measurement can be realized by combining the monochromator according to aspect 3 with a plane diffraction grating rotating mechanism which causes the plane diffraction grating to rotate about an axis parallel to the grating, a light receiver, a control section and a display.

According to the invention recited in aspect 6, the advantage of using the depolarizing plate of the invention can be further increased by designing a multi-pass optical spectrum analyzer which has a reflecting unit for reflecting the reflected light from the second concave mirror such that light is incident on the plane diffraction grating by a plurality of times.

What is claimed is:

1. A depolarizing plate comprising:
    a first rectangular wedge plate that has a first crystallographic optical axis in a diagonal direction of the rectangle and which has a thickness thereof in a vertical direction varying continuously in a direction 45 degrees from said first crystallographic optical axis; and
    a second rectangular wedge plate that has a second crystallographic optical axis in a diagonal direction of the rectangle crossing said first crystallographic optical axis at right angles and which has a thickness thereof in a vertical direction varying continuously in a direction 45 degrees from said second crystallographic optical axis,
    said two wedge plates being joined in such a position that said first crystallographic optical axis crosses said second crystallographic optical axis at right angles, wherein
        the slope formed by the joint of said wedge plates is rotated about the optical axis of an incident ray of light.

2. A monochromator comprising:
an entrance slit through which incident light passes;
a first concave mirror to collimate light passing through the entrance slit to provide parallel light;
a depolarizing plate provided between said entrance slit and said first concave mirror;
a plane diffraction grating which diffracts the parallel light from said concave mirror;
a second concave mirror which condenses the diffracted light from said plane diffraction grating; and
an exit slit for selecting only a specified wavelength component of light;
wherein said depolarizing plate comprises:
    a first rectangular wedge plate that has a first crystallographic optical axis in a diagonal direction of the rectangle and which has a thickness thereof in a vertical direction varying continuously in a direction 45 degrees from said first crystallographic optical axis; and
    a second rectangular wedge plate that has a second crystallographic optical axis in a diagonal direction of the rectangle crossing said first crystallographic optical axis at right angles and which has a thickness thereof in a vertical direction varying continuously in a direction 45 degrees from said second crystallographic optical axis,
    said two wedge plates being joined in such a position that said first crystallographic optical axis crosses said second crystallographic optical axis at right angles, wherein
        a slope formed by the joint of said wedge plates is rotated about the optical axis of an incident ray of light.

3. The monochromator according to claim 2, wherein a slope formed by the joint of said wedge plates is rotated about the optical axis of an incident ray of light such that the rays of light split by said depolarizing plate pass through a rectangular opening in said exit slit simultaneously.

4. A multi-pass monochromator, comprising:
an entrance slit through which incident light passes;
a first concave mirror to collimate light passing through the entrance slit to provide parallel light;
a depolarizing plate provided between said entrance slit and said first concave mirror;
a plane diffraction grating which diffracts the parallel light from said concave mirror;
a second concave mirror which condenses the diffracted light from said plane diffraction grating;

an exit slit for selecting only a specified wavelength component of light; and a reflecting unit for reflecting the reflected light from said second concave mirror such that light is incident on said plane diffraction grating a plurality of times, wherein said depolarizing plate comprises:
- a first rectangular wedge plate that has a first crystallographic optical axis in a diagonal direction of the rectangle and which has a thickness thereof in a vertical direction varying continuously in a direction 45 degrees from said first crystallographic optical axis; and
- a second rectangular wedge plate that has a second crystallographic optical axis in a diagonal direction of the rectangle crossing said first crystallographic optical axis at right angles and which has a thickness thereof in a vertical direction varying continuously in a direction 45 degrees from said second crystallographic optical axis,
- said two wedge plates being joined in such a position that said first crystallographic optical axis crosses said second crystallographic optical axis at right angles, wherein
  - a slope formed by the joint of said wedge plates is rotated about the optical axis of an incident ray of light such that the rays of light split by said depolarizing plate pass through a rectangular opening in said exit slit simultaneously.

5. An optical spectrum analyzer comprising:

an entrance slit through which incident light passes, a first concave mirror to collimate light passing through the entrance slit to provide parallel light, a depolarizing plate provided between said entrance slit and said first concave mirror, a plane diffraction grating which diffracts the parallel light from said concave mirror, a second concave mirror which condenses the diffracted light from said plane diffraction grating, an exit slit for selecting only a specified wavelength component of light, a plane diffraction grating rotating mechanism which causes said plane diffraction grating to rotate about an axis parallel to said grating, a light receiver, a control section, and a display, wherein said depolarizing plate comprises:
- a first rectangular wedge plate that has a first crystallographic optical axis in a diagonal direction of the rectangle and which has a thickness thereof in a vertical direction varying continuously in a direction 45 degrees from said first crystallographic optical axis; and
- a second rectangular wedge plate that has a second crystallographic optical axis in a diagonal direction of the rectangle crossing said first crystallographic optical axis at right angles and which has a thickness thereof in a vertical direction varying continuously in a direction 45 degrees from said second crystallographic optical axis,
- said two wedge plates being joined in such a position that said first crystallographic optical axis crosses said second crystallographic optical axis at right angles, wherein
  - a slope formed by the joint of said wedge plates is rotated about the optical axis of an incident ray of light such that the rays of light split by said depolarizing plate pass through a rectangular opening in said exit slit simultaneously.

6. An optical spectrum analyzer according to claim 5, comprising:

a reflecting unit for reflecting the reflected light from said second concave mirror such that light is incident on said plane diffraction grating a plurality of times.

* * * * *